Figure 1A:
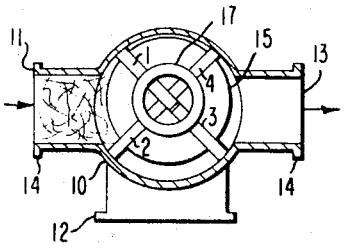
Figure 1B:
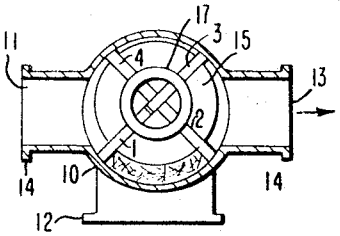
Figure 1C:
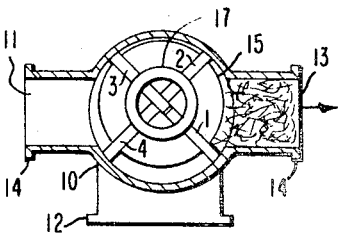
Figure 1D:
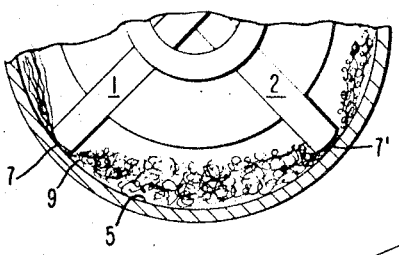
Figure 2:
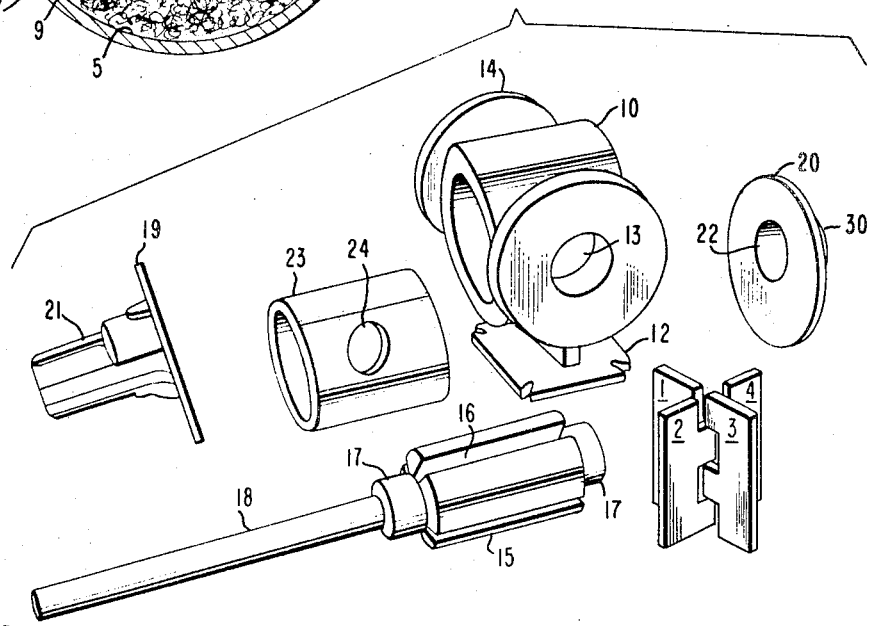
Figure 3:
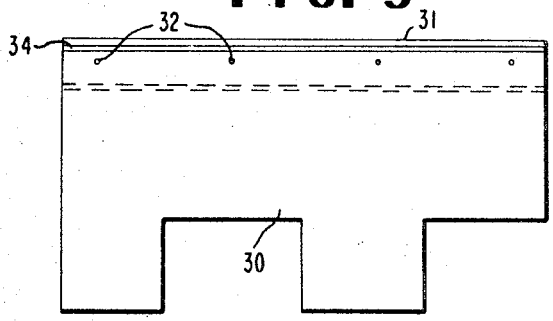
Figure 4:
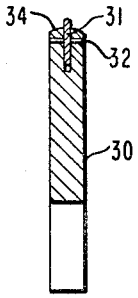
Figure 5:
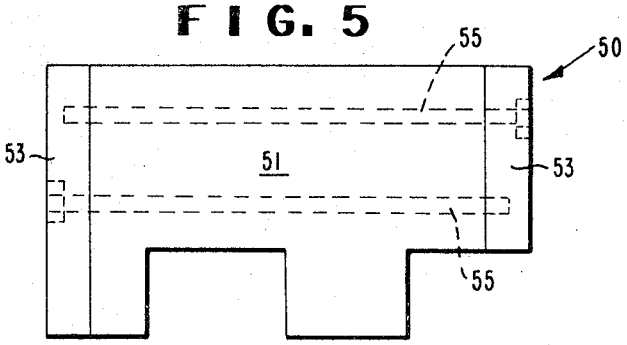
Figure 6:
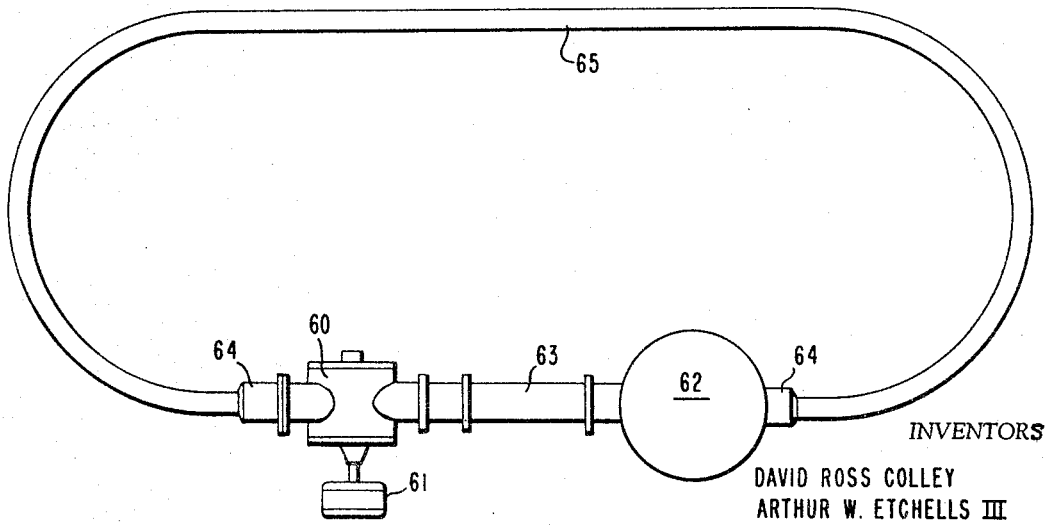

T863009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

767,792

PROCESS FOR TRANSPORTING LIQUID DISPERSIONS

David Ross Colley, Wilmington, Del., and Arthur W. Etchells III, Philadelphia, Pa., assignors to E. I. du Pont de Nemours and Company, Wilmington, Del., a corporation of Delaware

Filed Oct. 15, 1968. Published June 24, 1969
Int. Cl. F04c *1/00, 13/00*
U.S. Cl. 103—136
2 Sheets Drawing. 25 Pages Specification

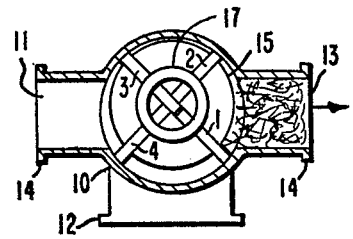

A process for transporting liquid dispersions of buoyant resilient foamed staple fibers wherein the dispersion is positively displaced as discrete separated consecutive portions by rotating the portions through a housing from an inlet to an outlet between at least two radially movable rotatable blades. A portion of the foamed staple is squeezed between the blades and housing and the staple not squeezed entwines with the squeezed portions to overcome the effect of centrally directed centripetal forces and provide for positive transport of the buoyant staple from the inlet to the outlet.

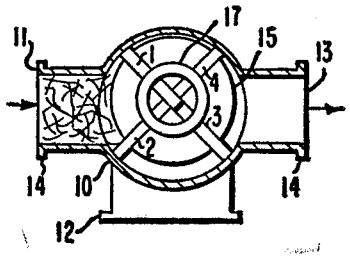

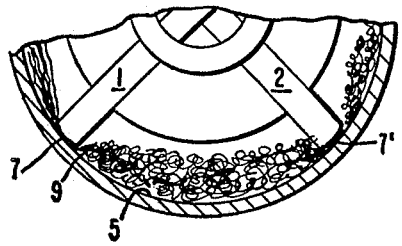

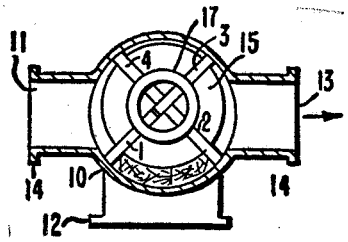

June 24, 1969 D. R. COLLEY ET AL DEF. PUB. T863009

PROCESS FOR TRANSPORTING LIQUID DISPERSIONS SN - 767792

Filed Oct. 15, 1968 Sheet 1 of 2

INVENTORS

DAVID ROSS COLLEY

ARTHUR W. ETCHELLS III

BY Howard P. West Jr.

ATTORNEY

June 24, 1969 D. R. COLLEY ET AL DEF. PUB. T863009

PROCESS FOR TRANSPORTING LIQUID DISPERSIONS SN - 767792

Filed Oct. 15, 1968 Sheet 2 of 2

INVENTORS
DAVID ROSS COLLEY
ARTHUR W. ETCHELLS III

BY Howard P. West Jr
ATTORNEY